No. 783,863. PATENTED FEB. 28, 1905.
R. HARRINGTON.
LOCK NUT FOR SCREW BOLTS.
APPLICATION FILED JAN. 3, 1905.
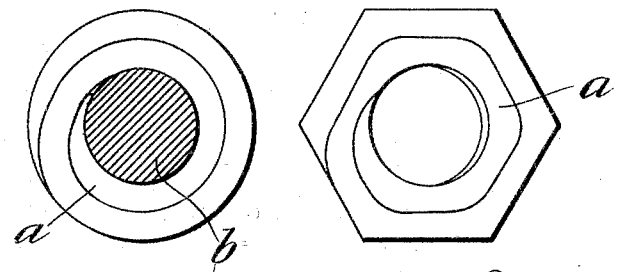
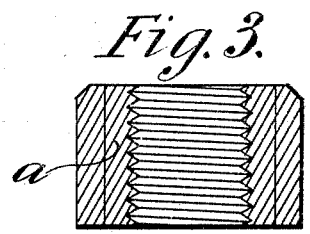
Witnesses:
Inventor
Roland Harrington No. 783,863. Patented February 28, 1905.

UNITED STATES PATENT OFFICE.

ROLAND HARRINGTON, OF WOLVERHAMPTON, ENGLAND.

LOCK-NUT FOR SCREW-BOLTS.

SPECIFICATION forming part of Letters Patent No. 783,863, dated February 28, 1905.

Application filed January 3, 1905. Serial No. 239,498.

*To all whom it may concern:*

Be it known that I, ROLAND HARRINGTON, a subject of the King of Great Britain, residing at 80 Bright street, Wolverhampton, in the county of Stafford, England, have invented certain new and useful Improvements in Lock-Nuts for Screw-Bolts, of which the following is a specification.

This invention relates to a nut for screw-bolts which locks itself in any position on the threaded portion of the bolt so as to be unaffected by the severest vibration.

To form the blank of the nut, a strip of spring-steel or other suitable elastic material is coiled on itself in convolutions round a mandrel which has the same diameter as that required for the tapping-hole in the nut. The strip is of such width and thickness that when convolutely coiled about twice round the mandrel in the manner described it forms roughly a cylinder of the length and diameter of the required nut. This cylindrical blank is now shaped under an oliver or hammer or machined in the usual manner to the desired form, and a thread is tapped in the tapping-hole previously occupied by the mandrel, this thread being slightly smaller in diameter than the thread on the bolt for which the nut is intended.

In the accompanying drawings, Figure 1 is a plan of the cylindrical blank made by coiling the strip *a* on itself in convolutions on the mandrel *b*. Fig. 2 is a plan of the shaped blank removed from the mandrel, and Fig. 3 is a vertical section through the finished nut.

When the nut is screwed onto the bolt, the thread of the latter being of slightly larger diameter than that of the former, the convolute coils of the nut are slightly expanded, so that the tension of the spring material of which they consist locks the nut on the bolt.

Having thus described the nature of this invention and the best means I know of carrying the same into practical effect, I claim—

A lock-nut consisting of a strip of suitable elastic material coiled on itself in convolutions and tapped with a thread of slightly smaller diameter than that of the thread on the screw-bolt for which the nut is intended, substantially as described.

In testimony whereof I have signed my name to this specification in the presence of two subscribing witnesses.

ROLAND HARRINGTON.

Witnesses:
 JOSEPH MILLARD,
 WALTER J. SKERTEN.